United States Patent Office 3,151,960
Patented Oct. 6, 1964

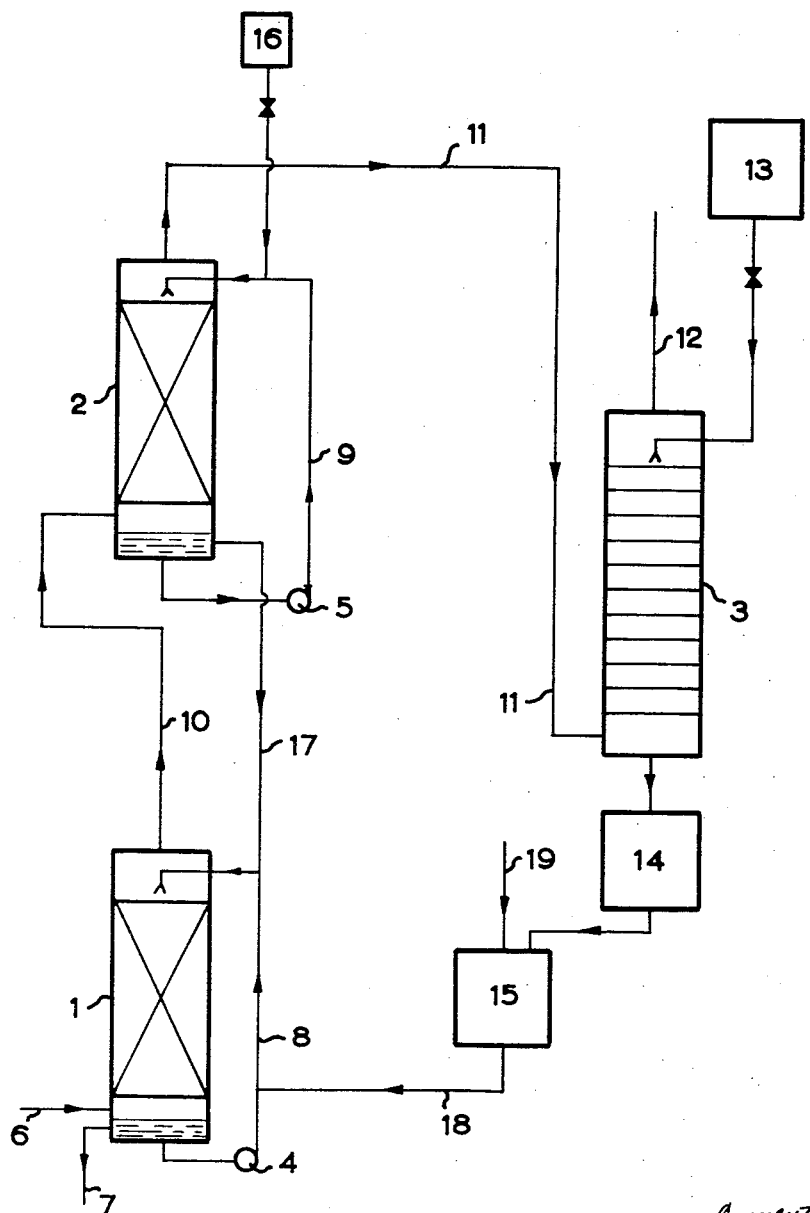

3,151,960
PROCESS FOR ABSORBING FORMALDEHYDE FROM A FORMALDEHYDE-CONTAINING GAS
Abraham H. de Rooij, Geleen, Netherlands, assignor to Stamicarbon N.V., Heerlen, Netherlands
Filed June 6, 1963, Ser. No. 286,088
Claims priority, application Netherlands, June 8, 1962, 279,553
4 Claims. (Cl. 55—94)

The present invention relates to an improved process for absorbing formaldehyde from a gas containing the same using urea solution as the absorbing medium.

It is known that formaldehyde can be absorbed from a formaldehyde-containing gas, such as formaldehyde synthesis gas obtained by oxidation and/or dehydrogenation of methyl alcohol, wherein the amount by weight of water vapor is about equal to the amount by weight of formaldehyde. This absorption may be accomplished by means of an absorbing solution which contains formaldehyde, urea, and water, and is circulated through an absorption column, that part of the circulating solution which corresponds to the formaldehyde-urea solution formed from the absorbed amount of formaldehyde and the urea-containing solution fed to the circulating absorption liquid as suppletion liquid, being continuously discharged. The gas issuing from the absorption column still contains an amount of non-absorbed formaldehyde which can be recovered in a second column by passing the same therethrough in counter-current relation with a urea solution supplied to the top of the column. If desired, the solution discharged from this second column may then be fed to the first column as suppletion liquid after solid urea has been dissolved in it.

Using the abovedescribed process, all the formaldehyde can be recovered from the synthesis gas in a very concentrated form as a formaldehyde-urea-water solution containing about 15% by weight of $H_2O$ and 4.5 to 10 moles of formaldehyde per mol of urea. However, this process suffers from the disadvantage that in the second column, formaldehyde-urea solutions are formed which are unstable and tend to separate off solid urea-formaldehyde condensates during the relatively long time of residence which is required in the column.

It is known that solutions with molar formaldehyde-urea ratios lower than 0.8 and higher than 4, are stable for a prolonged period of time. On the other hand, solutions with a molar formaldehyde-urea ratio varying from 1 to 3.5 are rather unstable. These lastmentioned solutions are formed in the second absorption column, or after addition of solid urea to the solution discharged from this column.

The principal object of the present invention is to improve the prior procedure referred to above. A more specific object of the invention is to so conduct the formaldehyde absorption that the formaldehyde gas in the absorption system is completely absorbed, with recovery of a concentrated formaldehyde-urea solution containing 13 to 20% by weight of water and 4.5 to 10 moles of formaldehyde per mol. of urea while avoiding the formation of an unstable solution during the absorption process.

According to the invention, the formaldehyde-containing gas is absorbed in three stages. In the first stage, the gas is brought into contact with a circulating absorption solution containing 13 to 20% by weight of water and 4.5 to 10 moles of formaldehyde per mol of urea. In the second stage, the non-absorbed gas from the first stage is subsequently brought into contact with a circulating absorption solution which also contains 13 to 20% by weight of water but only 3.5 to 4.1 moles of formaldehyde per mol of urea. Thereafter, in the third stage, the still unabsorbed gas is finally washed in counter-current relation with a continuously supplied 40–65% by weight urea solution.

The present process is carried out in such a way that the solution produced in the last absorption stage contains less than 1, and preferably less than 0.8 mol of formaldehyde per mol of urea. In addition, a 66–70% by weight urea solution is continuously supplied to the second or middle absorption stage with continuous discharging of the solution formed therein by absorption of formaldehyde. The solutions discharged from the second and the third stages, after dissolving solid urea, if necessary, in the solution discharged from the last stage, are continuously fed as suppletion liquids to the first absorption stage.

As is known, it is desirable in view of the stability of the circulating absorption solutions, to keep the pH of these solutions at about 8. This may be done in a customary way by addition of NaOH or the like.

In practicing the present process, it is preferred to control the temperature in the three absorption stages so that the water vapor pressure in the gas approximately equals the water vapor pressure of the absorbing solutions. In this way no water vapor will condense from the gas and no water will evaporate from the solutions during the absorption process. Usually the operating temperature in these stages will be in the range of 45 to 65° C. and the water vapor pressure therein will be of the order of 50 to 400 mm. Hg. Total gas pressure in these stages will vary from about 1 to 5 atmospheres.

The following example illustrates, without limiting the invention, in conjunction with the accompanying flow sheet wherein the numerals 1, 2 and 3 represent the absorption stages. Pump 4 provides for the circulation of the absorption solution through column 1 via conduit 8; pump 5 provides for the circulation of the absorption solution through column 2 via conduit 9.

The formaldehyde-containing gas is supplied via conduit 6 and the desired concentrated formaldehyde- and urea-containing solution is discharged via conduit 7.

The gases not absorbed in column 1 are fed to the base of column 2 via conduit 10; gases not absorbed in column 2 pass, via conduit 11, to the base of column 3, in which the last traces of formaldehyde are caught. The gases freed of formaldehyde leave the absorption system via conduit 12.

A continuous stream of urea solution (40–65% urea) flows from reservoir 13 into the upper part of column 3. From reservoir 16 a continuous stream of urea solution (66–70% urea) is supplied to the solution circulating through column 2. In addition, some alkali is continuously fed to reservoir 16 to keep the pH of the circulating solution constant (about pH 8).

An amount of solution corresponding to the amount of urea solution continuously supplied from reservoir 16, with the formaldehyde absorbed therein, is continuously drawn from column (2) to be added, as suppletion liquid, via conduit 17, to the solution circulating through column 1.

The solution discharged from the base of column 3 passes via a buffer vessel 14 to a mixing vessel 15, to which also solid urea or NaOH may be supplied via conduit 19. The solution present in mixing vessel 15 is also supplied, as suppletion liquid, via conduit 18, to the solution circulating through column 1.

*Example*

19,700 m.³ of gas mixture per hour, with a temperature of 135° C. and a pressure of 1.07 atm., were fed to column 1. This gas mixture contained 1050 kg. formaldehyde, the balance mainly being nitrogen, oxygen, and water vapour (about 76, 7 and 9% by volume respectively).

Every hour $2.2 \times 10^5$ kg. of an absorption solution containing 59% by weight of formaldehyde, 24.5% by weight of urea, and 15.6% by weight of water, were circulated through column 1. 800 kg. of formaldehyde per hour were absorbed in column 1 representing an absorption yield in the first stage amounting to 76%. The gas left the column 1 at a temperature of 55° C.

In column 2, 97 kg. of formaldehyde were absorbed from the gas leaving column 1 with an absorption solution containing 57.4% by weight of formaldehyde, 28.8% by weight of urea, and 13.8% by weight of water, the solution being circulated in the amount of $4 \times 10^4$ kg. The gas issuing from column 2 was washed in countercurrent relation with a 61.3% by weight urea solution in scrubber 3 using 658 kg. of the solution per hour. This absorbed 153 kg. of formaldehyde. Every hour, 811 kg. of solution containing formaldehyde and urea (18.8% formaldehyde, 49.8% urea, and 31.4% of water) from column 3 were supplied, via buffer vessel 14, mixing vessel 15, and conduit 18 to the solution circulating through column 1.

72 kg. per hour of a 68% urea solution were supplied from reservoir 16 to the circulating absorption liquid and 169 kg. per hour of solution containing formaldehyde and urea were fed via conduit 17 to the solution circulating through column 1. The combined absorption yield of columns 1 and 2 amounted to 85.5%.

1780 kg. of solution per hour, containing 1050 kg. of formaldehyde, 452 kg. of urea, and 278 kg. of water, were discharged from column 1 via conduit 7.

The invention may be used in the treatment of any type of formaldehyde-containing gas. However, it is of particular value in treating formaldehyde synthesis gas. Usually, such gas will comprise from 85 to 300 kg. of formaldehyde per 1000 m.$^3$ of gas, the remaining components consisting essentially of from about 40 to 80% nitrogen, 0 to 10% oxygen and 20 to 10% water vapor, the percentages by volume.

As will be appreciated, rates of gas flow, temperatures and other operating conditions can be varied widely but they should be appropriately correlated to give the desired and necessary concentrations for the solutions discharged from the various stages and/or fed thereto. As typical time, temperature and pressure conditions, there may be mentioned the following:

|  | First Stage | Second Stage | Third Stage |
|---|---|---|---|
| Liquid Temperature, ° C.: |  |  |  |
| Entering | 54 | 52 | 52 |
| Exit | 60 | 54 | 52 |
| Gas Temperature, ° C.: |  |  |  |
| Entering | 135 | 55 | 52 |
| Exit | 55 | 52 | 52 |
| Gas Pressure, atm.: |  |  |  |
| Entering | 1.07 | 1.05 | 1.02 |
| Contact Time between gas and liquid, sec | 10 | 10 | 10 |

Using the accompanying flow sheet described above, the following details as to liquid/gas proportions may be given for operations, according to the invention, on an hourly basis, for the treatment of gas containing about 1000 kg. of formaldehyde:

(1) from 650 to 800 kg. of urea solution added to stage 3 from reservoir 13;
(2) from 800 to 950 kg. of solution withdrawn from stage 3 for feeding as suppletion liquid to stage 1;
(3) from 70 to 85 kg. of urea solution added to stage 2 from reservoir 16; and
(4) from 160 to 190 kg. of solution withdrawn from stage 2 and fed to stage 1 as suppletion liquid with that from vessel 15.

Various modifications may be made in the invention described herein without deviating therefrom as defined in the following claims wherein what is claimed is:

1. In a process for absorbing formaldehyde from a formaldehyde-containing gas by countercurrently contacting said gas with urea solution in a plurality of successive absorption stages with the formation and recovery of a concentrated solution of formaldehyde and urea containing 13 to 20% by weight of water and 4.5 to 10 mols of formaldehyde per mol of urea, the improvement which comprises passing said formaldehyde-containing gas successively through three absorption stages, contacting said gas in the first stage with a circulating absorption solution containing 13 to 20% by weight of water and 4.5 to 10 mols of formaldehyde per mol of urea, thereafter contacting the gas in the second absorption stage with a circulating absorption solution containing 13 to 20% by weight of water and 3.5 to 4.1 mols of formaldehyde per mol of urea and then washing the gas in the third absorption stage in countercurrent relation with a continuously supplied solution containing 40 to 65% by weight of urea, withdrawing a solution from said third stage containing less than 1 mol of formaldehyde per mol of urea, continuously supplying a 66 to 70% by weight urea solution to the second absorption stage, continuously discharging from the second stage the solution formed therein by absorption of formaldehyde with said 66 to 70% urea solution, continuously feeding the liquids discharged from said second and third stages into the first absorption stage as a suppletion liquid fed thereto and continuously discharging the solution formed in said first stage by absorption of formaldehyde in said suppletion liquid.

2. The process of claim 1 wherein the solution produced in the third absorption stage contains less than 0.8 mol of formaldehyde per mol of urea.

3. The process of claim 1 wherein solid urea is added to the solution discharged from the third absorption stage.

4. The process of claim 1 wherein the temperatures in the absorption stages are so controlled that the water vapor pressure of the gas mixture present in these stages approximately equals the water vapor pressure of the solution used for the absorption of formaldehyde.

References Cited in the file of this patent

UNITED STATES PATENTS

| 2,977,386 | Kise | Mar. 28, 1961 |
| 3,067,177 | Greco et al. | Dec. 4, 1962 |